Figure 1:
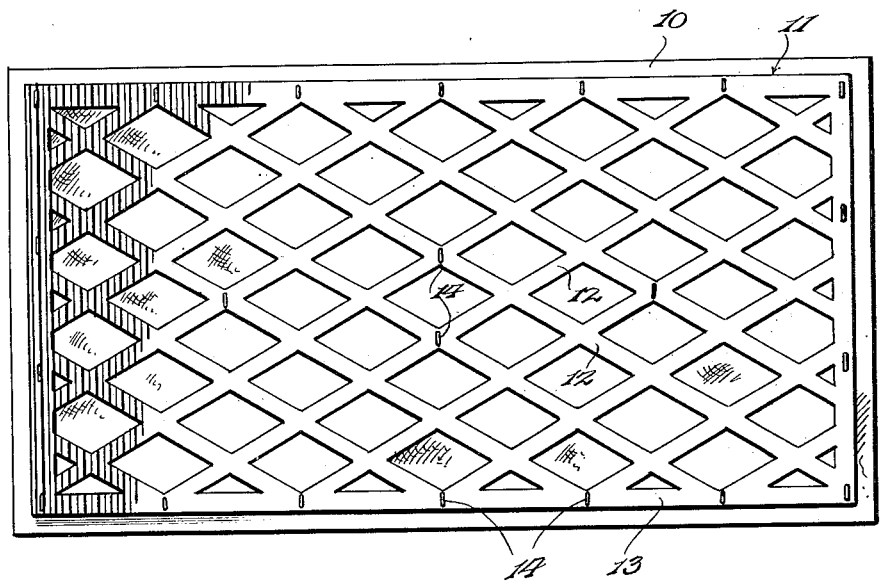

April 1, 1924.

C. C. BROWN

RUG

Filed July 19, 1922

1,488,804

Inventor

C. C. Brown.

By Lacey & Lacey, Attorneys

Patented Apr. 1, 1924.

1,488,804

UNITED STATES PATENT OFFICE.

CHARLES C. BROWN, OF KNOXVILLE, PENNSYLVANIA.

RUG.

Application filed July 19, 1922. Serial No. 576,152.

*To all whom it may concern:*

Be it known that I, CHARLES C. BROWN, citizen of the United States, residing at Knoxville, in the county of Tioga and State of Pennsylvania, have invented certain new and useful Improvements in Rugs, of which the following is a specification.

This invention relates to an improved rug and seeks, as one of its principal objects, to provide a rug which will not slip upon polished floors under the weight of a person stepping on the rug.

The invention has as a further object to provide a rug which will be frictionally held against slipping and wherein the rug will be so constructed that scratching or other injury to a floor by the rug will be prevented.

Another object of the invention is to provide a rug embodying a friction grill to lie against the floor for frictionally holding the rug against slipping and wherein the grill will be fluted to effectually engage the floor as well as to hold the rug against creeping under the weight of a person stepping upon the rug.

And the invention has as a still further object to provide a rug wherein the grill may be readily detached from the fabric body of the rug so that when the fabric body becomes worn out, the grill may be removed and applied to a new fabric body.

Other and incidental objects will appear hereinafter.

Figure 2:
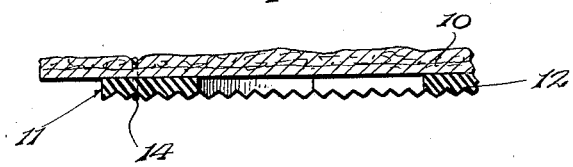
Figure 3:
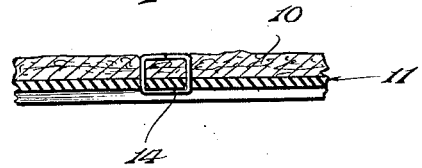

In the drawing:

Figure 1 is a bottom plan view of my improved rug, particularly illustrating the friction grill of the rug, Figure 2 is a fragmentary sectional view showing the fluting of the grill, and Figure 3 is a fragmentary sectional view particularly showing the manner in which the grill is detachably connected to the fabric body of the rug.

In carrying the invention into effect, I employ a rug body 10. This rug body may be of fabric or other approved material and, in the present instance, is shown as being oblong in shape. Lying against the lower side of the rug body is a friction grill or element 11. This friction grill is also oblong in shape to conform to the contour of the rug body but is slightly smaller than the rug body so that the margins of the rug body will, when the rug is lying upon a floor, sag downwardly over the edges of the grill to touch the floor and consequently conceal the grill. The grill is formed from a single piece of rubber and preferably comprises a plurality of intersecting diagonally disposed webs 12 connected at their ends by a rim band 13 and extending through the band and through several of the webs 12 are staples 14 securing the grill to the rug body. As best shown in Figure 3, the staples are preferably first inserted through the grill and then through the rug body when the free ends of the staples are bent downward against the upper side of the rug body.

Attention is now directed to the fact that the grill 11 is fluted at its lower side, the flutes extending transversely of the grill. Consequently, the ribs thus produced will, in the practical use of the rug, lie against the floor to frictionally coact therewith so that the grill will effectually hold the rug against slipping. Furthermore, the diagonal webs of the grill, in conjunction with the ribs, will function to prevent the rug from creeping under the weight of a person stepping thereon. I accordingly provide a rug which may be safely used upon polished floors and, as will now be seen, when the rug body becomes worn out, the grill may be readily detached therefrom and used in conjunction with a new rug body.

Having thus described the invention, what is claimed as new is:

1. A rug including a rug body, a friction grill overlying the rug body at its lower side, and means extending through the grill and rug body detachably connecting the grill thereto.

2. A rug including a rug body, and a friction grill carried by the rug body at its lower side, the grill conforming in shape to the outline of the rug body and terminating near the edges thereof, and staples detachably connecting the grill to the rug body.

3. A rug including a rug body, and a friction element overlying the rug body at its lower side, the lower face of said element being fluted.

4. A rug including a rug body, and a rubber friction grill overlying the rug body at its lower side, the grill comprising a plurality of intersecting diagonally disposed webs and being fluted at its lower face.

In testimony whereof I affix my signature.

CHARLES C. BROWN. [L. S,]